United States Patent
Müller et al.

(10) Patent No.: US 6,182,912 B1
(45) Date of Patent: Feb. 6, 2001

(54) FUEL INJECTION VALVE

(75) Inventors: Martin Müller, Möglingen; Stefan Herold, Hallstadt; Jochen Riefenstahl; Reinhold Brückner, both of Litzendorf; Dirk Fischbach, Bamberg; Andreas Eichendorf, Schorndorf; Martin Bühner, Backnang; Rainer Norgauer, Ludwigsburg; Jürgen Virnekäs, Breitbrunn; Peter Schramm, Knetzgau; Hans Weidler, Pettstadt; Christian Preussner, Markgröningen; Thomas Keil, Bamberg; Oliver Kirsten, Kulmbach; Ottmar Martin, Hochdorf/Eberdingen; Wolfgang Leuschner, Eggolscheim, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/284,308

(22) PCT Filed: Jun. 26, 1998

(86) PCT No.: PCT/DE98/01758

§ 371 Date: Aug. 27, 1999

§ 102(e) Date: Aug. 27, 1999

(87) PCT Pub. No.: WO99/10648

PCT Pub. Date: Mar. 4, 1999

(30) Foreign Application Priority Data

Aug. 22, 1997 (DE) .............................. 197 36 684

(51) Int. Cl.[7] ....................................................... B05B 1/30
(52) U.S. Cl. .................................. 239/585.1; 251/129.21
(58) Field of Search .......................... 239/585.1–585.5, 239/473, 490, 491, 463, 596, 472, 494, 496–7, 533.12; 251/129.21, 129.18, 129.15

(56) References Cited

U.S. PATENT DOCUMENTS

| 4,274,598 | 6/1981 | Wilfert et al. . |
| 4,971,254 | 11/1990 | Daly et al. . |
| 5,044,561 | 9/1991 | Holzgrefe . |
| 5,108,037 | * 4/1992 | Okamoto et al. ..................... 239/473 |
| 5,209,408 | 5/1993 | Reiter . |
| 5,570,841 | * 11/1996 | Pace et al. ......................... 239/585.1 |
| 5,875,972 | * 3/1999 | Ren et al. ............................ 239/463 |
| 5,979,801 | * 11/1999 | Munezane et al. ............. 239/533.12 |

FOREIGN PATENT DOCUMENTS

| 33 01 501 | 8/1983 | (DE) . |
| 39 43 005 | 7/1990 | (DE) . |
| 042 799 | 12/1981 | (EP) . |
| 387 085 | 9/1990 | (EP) . |

* cited by examiner

*Primary Examiner*—Andres Kashnikow
*Assistant Examiner*—Lisa Ann Douglas
(74) *Attorney, Agent, or Firm*—Kenyon & Kenyon

(57) ABSTRACT

A fuel injection valve, in particular a high-pressure injection valve for the direct injection of fuel into the combustion chamber of a compressed mixture, externally ignited internal combustion engine, has in a guide and seat area provided at the downstream end of the valve which area is formed by three disk-shaped elements. A swirl element is nested between a guide element and a valve seat element. The guide element, which can move radially in the assembled valve and which has an inner guide opening, serves to guide an axially movable valve needle which extends through it, while a valve closing section of the valve needle acts in concert with a valve seat surface of the valve seat element. The guide element is spring-loaded through a compression spring which acts upon it.

17 Claims, 7 Drawing Sheets

FUEL INJECTION VALVE

FIELD OF THE INVENTION

The present invention is based on a fuel injection valve according to the definition of the species of the main claim.

BACKGROUND INFORMATION

A fuel injection valve capable of being electromagnetically actuated in which a plurality of disk-shaped elements are arranged in the seat area is described German Patent No. 39 43 005. Upon excitation of the magnetic circuit, a flat valve plate functioning as a flat armature is raised off an opposite valve seat plate which acts in concert with it, the two together forming a plate valve part. Upstream of the valve seat plate, a swirl element is arranged which causes the fuel flowing toward the valve seat to move in a circular, swirling motion. A stop plate limits the axial path of the valve plate on the side opposite the valve seat plate. The valve plate is enveloped by the swirl element with a large amount of play; thus the swirl element assumes a certain guiding function with respect to the valve plate, In addition, a spacer element is also provided between the stop plate and the swirl element, the spacer element having an opening in the interior into which the valve plate is brought with a large degree of play. The swirl element, the spacer element, and the stop plate lie one on top of the other and are installed as a fixed part of the housing in the valve.

In addition, a fuel injection valve is described in German Patent No. 33 01 501 in which an axially movable valve needle has a valve closing section that works in concert with a valve seat surface of a valve seat insert to open and close the valve. Upstream of its valve seat surface, the valve seat insert has a guide opening in which the valve needle is guided. In addition to the valve seat insert, a guide washer configured separately from the valve seat insert is provided in the nozzle housing and rests against the shoulder of the nozzle housing. A spring arranged between the guide washer and the valve seat insert causes the two components to be pressed in precisely opposite directions into the desired positions in the nozzle housing. As a result of the spatial arrangement of the spring, the spring on the guide washer is thus prestressed away from the valve seat insert and toward the shoulder in the housing opposite the valve seat insert. The guide washer with its guide opening forms an upper guide for the valve needle, with the guide washer being widely separated from the valve seat by the spring situated between it and the valve seat insert.

SUMMARY OF THE INVENTION

The fuel injection valve according to the present invention has an advantage that it can be manufactured at a reduced cost in a particularly simple manner, As a result of its particularly simple construction with only one precisely dimensioned interior guide opening, the guide element is simple to manufacture. All other dimensions of the guide element can be provided with distinctly higher tolerances. In a particularly advantageous manner, the guide element serves largely only to guide the valve needle, which extends through it. Thus there is a separation of functions from the other elements following downstream.

In an advantageous manner, the guide element is "softly" spring-loaded in the housing of the valve via a compression spring. The guide element, which can move radially in the housing, for example in a valve seat support, can be aligned with respect to the valve seat element even after the valve seat element has been fastened. Thus in a simple manner, any slight dimensional deviations which may occur in fastening (for example, welding) the valve seat element can still be compensated for with the guide element. As a result of the relative radial movement of the guide element with respect to the valve seat after the latter has been fastened and after the guide element has been spring-loaded, there is a lower self-centering guide arrangement close to the valve seat. Overall, the procedures for adjusting and positioning are significantly simplified. In an advantageous manner, the separate guide element is present in direct proximity of the valve seat element so that the valve needle can still be aligned very close to its valve closing section.

The modular construction of the elements and the associated separation of functions has the advantage that individual components can be configured with much flexibility so that by simple variation of one element, various spray configurations (spray angle, static spray quantity) can be produced.

In addition to the guide function described above, the face of the guide element also serves, however, as a cover for swirl channels that follow downstream of the guide opening as a means for generating swirl.

It is advantageous for the guide element to be accommodated in a recess of the support element. Like the guide element, the support element, which by way of example has a cylindrical exterior contour, has a guide opening in which the valve needle can move axially, with the guide opening of the support element being designed with greater play with respect to the valve needle than the guide opening of the guide element. As a result of the relatively great play with respect to the valve needle, the support element can be manufactured and installed at a reduced cost. The support element serves to pre-center the valve needle during assembly and can also be used as an "emergency guide." If dirt or other deposits cause the guide element to adhere to the valve needle and move axially with it, the guide opening of the support element can still assume guidance of the valve needle.

In a particularly advantageous manner, a disk-shaped swirl element is provided downstream of the guide element which is very simply structured and as a result can be very easily molded. The only function left for the swirl element is to create a swirl of rotating movement in the fuel and in so doing as far as possible not to allow interfering turbulence to develop in the fluid. All other valve functions are assumed by other components of the valve. In this way, the swirl element can be machined in an optimized manner. Since the swirl element is a single component, no restrictions in handling it in the manufacturing process should be expected. In comparison with swirl units which have grooves or similar swirl-generating recesses on one face, it is possible by the simplest of means to create an interior opening area which extends over the entire axial thickness of the swirl element and is surrounded by an exterior encircling border area.

In an advantageous manner, a desired extension of the swirl channels can be achieved through curving or kinking. The hook-shaped ends of the swirl channels serve as collecting pockets which form a reservoir over a large area for low-turbulence inflow of the fuel. Following deflection of the flow, the fuel enters the actual, tangential swirl channels slowly and at low turbulence, as a result of which a swirl largely free of disturbance can be created.

In addition to the manufacture of the swirl element from a metal sheet and its processing through stamping, laser cutting, or wire EDM, it can be very advantageous to build up the swirl element through electrochemical precipitation. Using this manufacturing technology, it is possible to create multilayer swirl elements in a simple manner in which multiple raised areas rise in the desired shape, with swirl channels being formed between the raised areas.

DETAILED DESCRIPTION

Figure 1:
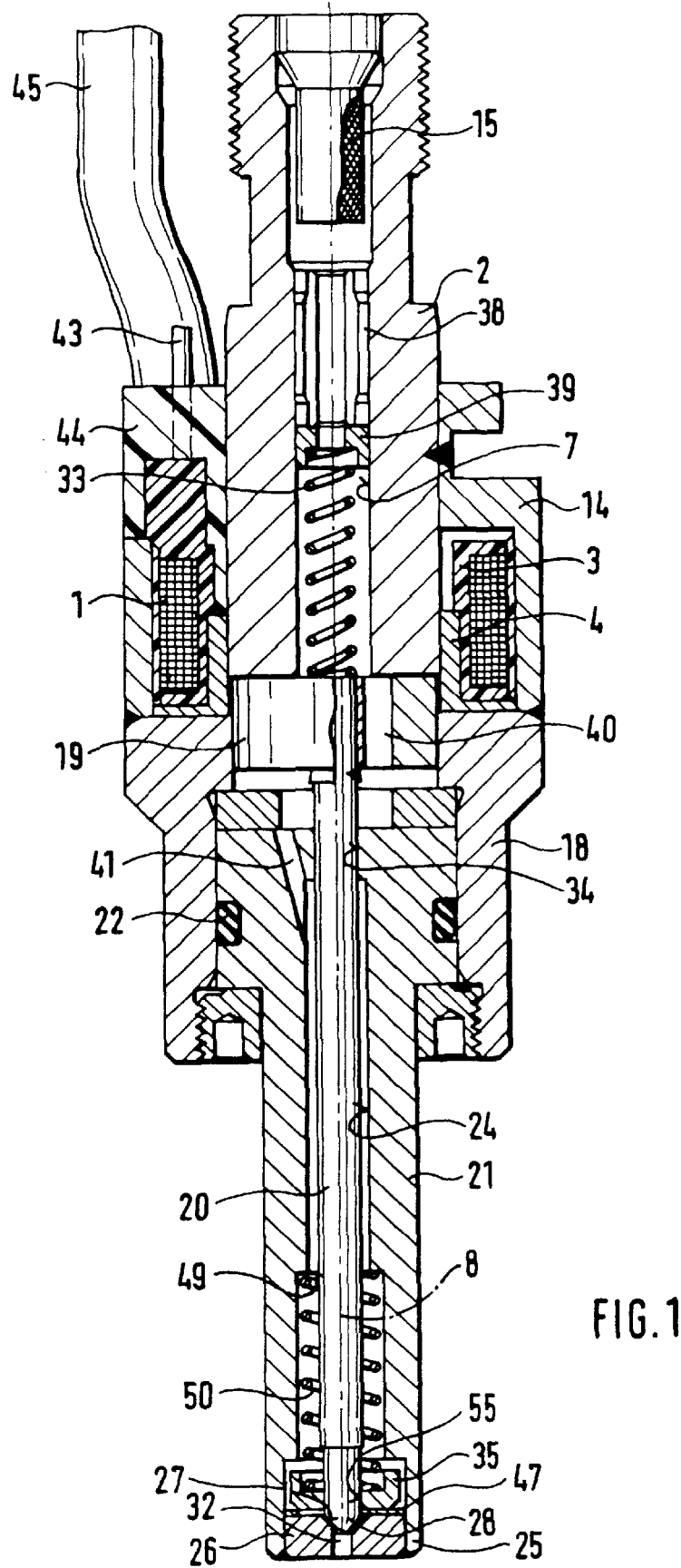
FIG. 1 shows a first exemplary embodiment of a fuel injection valve according to the present invention.

The electromagnetically actuated valve in the form of an injection valve for fuel injection systems of compressed mixture, externally ignited internal combustion engines depicted in FIG. 1 as an exemplary embodiment has a pipe-shaped, largely hollow cylindrical core 2 surrounded at least partially by a magnet coil 1, serving as the internal pole of a magnetic circuit. The fuel injection valve is particularly suited as a high-pressure injection valve for the direct injection of fuel into a combustion chamber of an internal combustion engine. For example, a stepped bobbin 3 of plastic receives a winding of magnetic coil 1 and, in combination with core 2 and a ring-shaped, non-magnetic intermediate piece 4 that is partially surrounded by magnet coil 1 and has an L-shaped cross section, makes possible a particularly compact and short structure of the injection valve in the area of magnet coil 1.

In core 2, a longitudinal through opening 7 is provided which extends along a longitudinal valve axis 8. Core 2 of the magnetic circuit also serves as fuel inlet nozzle with longitudinal opening 7 representing a fuel supply channel.

Permanently attached to core 2 above magnet coil 1 is an external metallic (for example, ferric) housing part 14, which closes the magnetic circuit as an external pole or external conductive element and which completely surrounds, at least in the circumferential direction, magnet coil 1. In longitudinal opening 7 of core 2, a fuel filter 15 is provided on the supply side that filters out fuel components which as a result of their size could cause obstructions or damage in the injection valve. Fuel filter 15 is fastened in core 2, for example, by press-fitting.

Core 2 together with housing part 14 forms the intake-side end of the fuel injection valve with upper housing part 14, for example, extending in axial direction viewed downstream just past magnet coil 1. Fastened tightly and immovably to upper housing part 14 is an axially movable lower, pipe-shaped housing part 18, which for example encloses or receives an axially movable valve part composed of an armature 19 and a bar-shaped valve needle 20 or an elongated valve seat support 21. Housing parts 14 and 18 are permanently attached to each other, by way of example, by a weld seam around the circumference.

In the exemplary embodiment depicted in FIG. 1, lower housing part 18 and largely pipe-shaped valve seat support 21 are firmly connected to each other by screws; however, welding, soldering, or flanging also represent possible joining processes. The seal between housing part 18 and valve seat support 21 is provided, for example, by a sealing ring 22. Through its entire axial length, valve seat support 21 has an interior passage opening 24 that runs concentrically to longitudinal valve axis 8.

With its lower end 25, which at the same time represents the downstream termination of the entire fuel injection valve, valve seat support 21 envelops a disk-shaped valve seat element 26, which is inserted into passage opening 24, with a frustum-shaped valve seat surface 27 tapering in downstream direction. Arranged in passage opening 24 is valve needle 20, which is, for example, bar-shaped and is largely circular in cross section and which has a valve closing section 28 at its downstream end. This valve closing section 28, which may for example be spherical or partially spherical or as shown in FIGS. 1–11, conically tapering, acts in a conventional manner in concert with valve seat surface 27 provided in valve seat element 26. Downstream from valve seat surface 27, at least one outlet opening 32 for the fuel is introduced in valve seat element 26.

The injection valve is actuated electromagnetically in a conventional manner. The electromagnetic circuit with magnet coil 1, core 2, housing parts 14 and 18, and armature 19 serves to move valve needle 20 axially and thus to open and close the injection valve against the spring resistance of a restoring spring 33 arranged in longitudinal opening 7 of core 2. Armature 19 is joined to the end of valve needle 20 facing away from valve closing section 28, for example by a welded seam, and is aligned with core 2. Guidance of valve needle 20 as it, together with armature 19, moves axially along valve longitudinal axis 8 is provided on one end by a guide opening 34 provided in valve seat support 21 at the end facing armature 19 and on the other by a disk-shaped guide element 35 arranged upstream from valve sea element 26 and having a precisely dimensioned guide opening 55 in which valve needle 20 has only a very slight play of approximately 1 $\mu$m to 20 $\mu$m. Armature 19 is surrounded during its axial movement by intermediate part 4.

An adjusting sleeve 38 pushed, pressed, or screwed into longitudinal opening 7 of core 2 serves for adjustment of the spring pre-tension of restoring spring 33, the upstream side of which contacts adjusting sleeve 38 via a centering piece 39 and the opposite side of which rests against armature 19. In armature 19, one or several bore-like flow channels 40 are provided through which the fuel can flow into passage opening 24 from longitudinal opening 7 in core 2 through connecting channels 41 formed in downstream direction from flow channels 40 close to guide opening 34 in valve seat support 21.

The lift of valve needle 20 is set by the installed position of valve seat element 26. One limit of travel of valve needle 20 is determined in the event of non-excited magnet coil 1 through the contact of valve closing section 28 with valve seat surface 27 of valve seat element 26, while the other limit of travel of valve needle 20 in the case of excited magnet coil 1 is determined by the contact of armature 19 with the downstream face of core 2. The surfaces of the components in the latter stop zone are, by way of example, chromed.

Magnet coil 1 is electrically contacted and thus excited via contact elements 43 which are provided with a plastic extrusion coat 44 outside of bobbin 3. Plastic extrusion coat 44 can also extend over additional components (for example, housing parts 14 and 18) of the fuel injection valve. Out of plastic extrusion coat 44 leads an electrical connecting cable 45 through which magnet coil 1 is energized. Plastic extrusion coat 44 protrudes through upper housing part 14 which is interrupted in this area.

Figure 2:
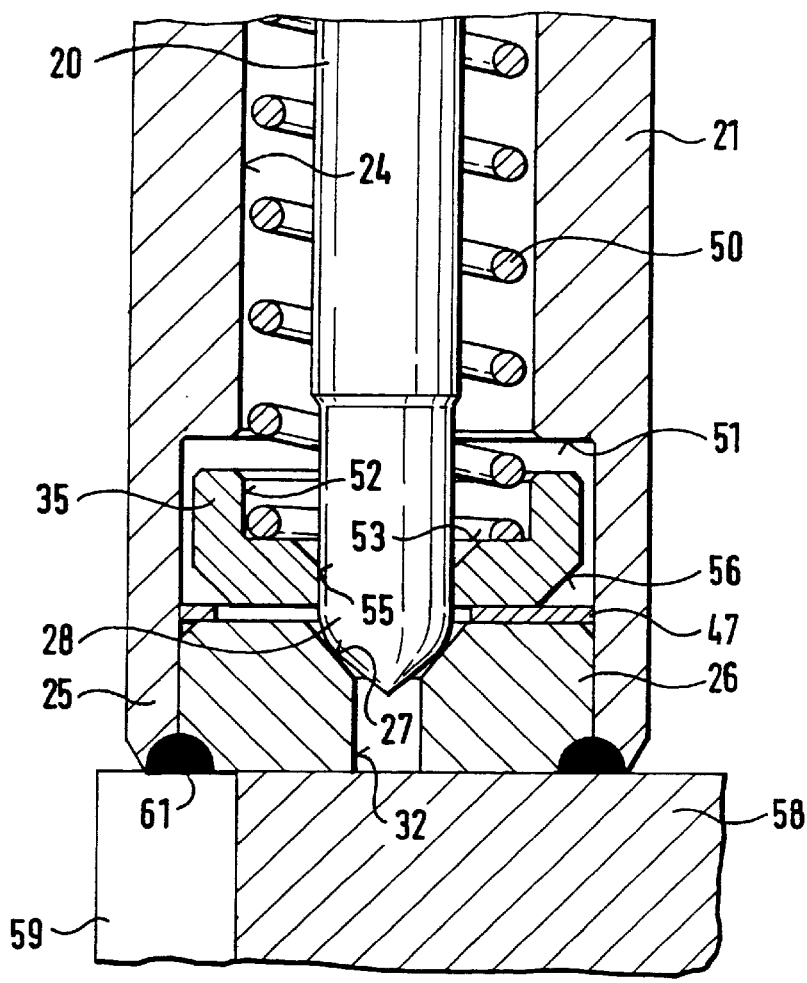
FIG. 2 shows a first exemplary embodiment according to the present invention of guide and seat area as an enlarged detail of FIG. 1.

In FIG. 2, the guide and seat area is presented as a detail from FIG. 1 with altered scale in order to more clearly show this valve area designed according to the present invention. The guide and seat area provided in downstream end 25 of valve seat support 21 in its passage opening 24 is formed in the exemplary embodiment presented in FIG. 2 by three axially successive, disk-shaped, functionally separated elements. In the downstream direction, guide element 35, a very flat swirl element 47, and valve seat element 26 follow in succession.

Downstream from guide opening 34, passage opening 24 of valve seat support 21 is designed, for example, with two steps, with the diameter of passage opening 24 being enlarged with each step viewed in downstream direction. First shoulder 49 (FIG. 1) serves as the support surface for a compression spring 50 which, for example, is helical. With second shoulder 51, an enlarged installation space is created for the three elements 35, 47, and 26. Compression spring 50 which envelops valve needle 20 softly pre-tensions the three elements 35, 47, and 26 in valve seat support 21, since on the side opposite shoulder 49, it presses against guide element 35. Therefore according to the present invention, there is a spring-loaded guide element 35 which, as a result of the installed position of compression spring 50 and its direction of action, is pressed in the direction of valve seat element 26 and the outside diameter of which has a large amount of play with respect to valve seat support 21. In order to have a sure support surface on guide element 35 for compression spring 50, the face toward swirl element 47 is provided with a recess 52 on the base 53 of which compression spring 50 rests.

Guide element 35 has a precisely dimensioned internal guide opening 55, through which valve needle 20 moves during its axial movement. The outside diameter of guide element 35 is selected to be smaller than the diameter of passage opening 24 downstream from step 51. Thus a flow of fuel along the external circumference of guide element 35 in the direction of valve seat surface 27 is assured. The fuel flows downstream of guide element 35 directly into swirl element 47, which Figure shows in a top view. For improved inflow close to the outer edge of swirl element 47, guide element 35 is provided, for example, with an encircling chamfer 56.

The three elements 35, 47, and 26 are situated with their faces directly adjacent. Before valve seat element 26 is firmly joined to valve seat support 21, an alignment procedure is performed on valve seat element 26. Valve seat element 26 is aligned with respect to the longitudinal axis of valve seat support 21 using a tool, for example in the form of a punch 58, which is suggested only schematically in FIG. 2 and which contacts the outer downstream face of valve seat element 26 and of valve seat support 21. This welding alignment punch 58 has, for example, a number of openings 59 distributed across its circumference through which valve seat element 26 is spot laser welded to valve seat support 21. After punch 58 is removed, valve seat element 26 can be welded completely around with a tight weld seam 61. Afterward guide element 35 is, for example, aligned again with respect to valve seat element 26 using valve needle 20 which rests upon valve seat surface 27.

Figure 3:
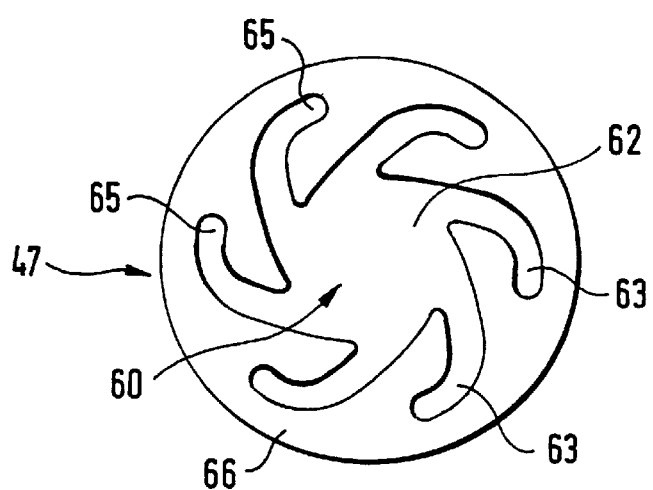
FIG. 3 shows a first exemplary embodiment according to the present invention of single-layer swirl element.

In FIG. 3, a swirl element 47 which is embedded between guide element 35 and valve seat element 26 is depicted as the top view of an individual component which is guided in passage opening 24 with the least possible play around the circumference. Swirl element 47 can be manufactured at a reduced cost from a metal sheet through stamping, wire EDM, laser cutting, etching, or other conventional methods. In swirl element 47, an internal opening 60 is formed which passes through the entire axial thickness of swirl element 47. Opening area 60 is formed by an internal swirl chamber 62, through which valve closing section 28 of valve needle 20 extends, and by a plurality of swirl channels 63 which open into swirl chamber 62. Swirl channels 63 open tangentially into swirl chamber 62, and their ends 65 facing away from swirl chamber 62 are not in contact with the outer circumference of swirl element 47. On the contrary, an encircling border area 66 remains between the ends 65 of swirl channels 63 and the outer circumference of swirl element 47.

With valve needle 20 installed, swirl chamber 62 is limited toward the inside by valve needle 20 (valve closing section 28) and toward the outside by the wall of opening area 60 of swirl element 47. As a result of the tangential junction of swirl channels 63 with swirl chamber 62, the fuel is given an angular momentum which is retained as it continues to flow into outlet opening 32. As a result of the centrifugal force, the fuel is sprayed out in the form of a hollow cone. A desired extension of swirl channels 63 is achieved, for example, through bending or kinking. Hook-shaped ends 65 of swirl channels 63 serve as collecting pockets which form a reservoir over a large area for the low-turbulence inflow of fuel. After the current is redirected, the fuel enters slowly and with low turbulence into the actual tangential swirl channels 63, as a result of which a largely undisturbed swirl can be generated.

Figure 5:
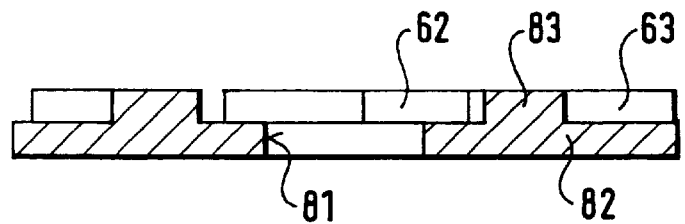
FIG. 5 shows a section through 1 the swirl element along the line V—V of FIG. 4.
Figure 4:
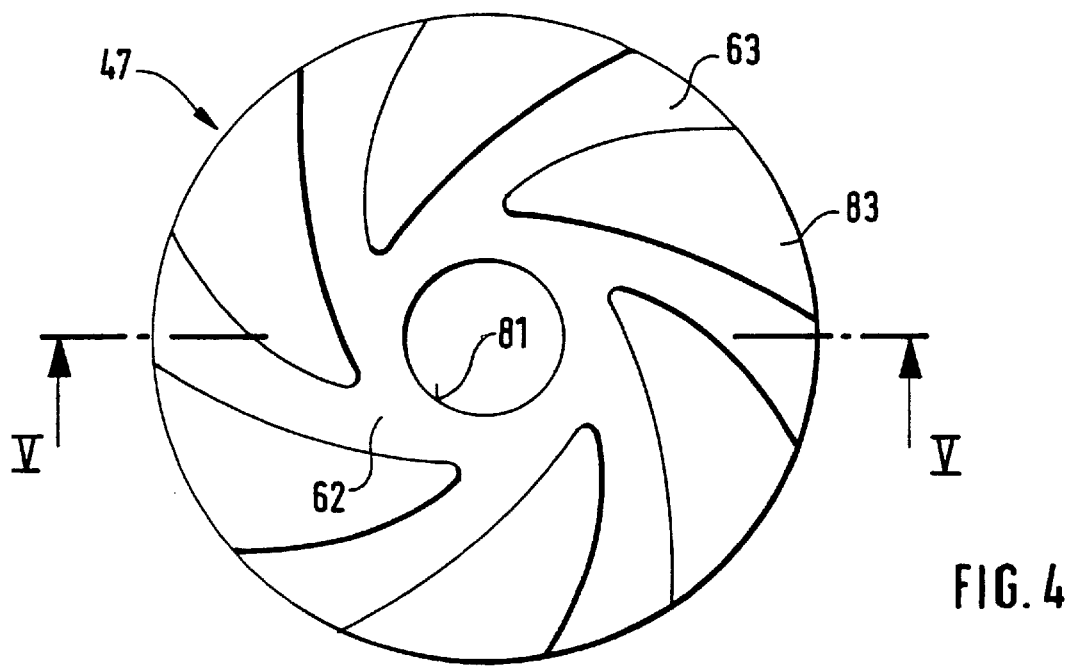
FIG. 4 shows a second exemplary embodiment according to the present invention of two-layer swirl element.
Figure 6:
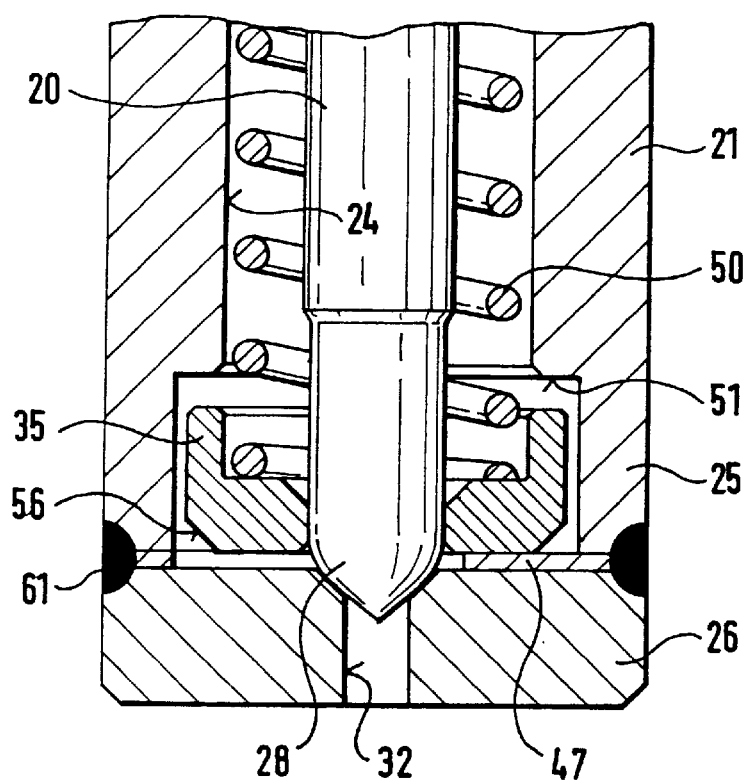
FIG. 6 shows a second exemplary embodiment according to the present invention of guide and seat area.

In place of swirl element 47 manufactured from a metal sheet, swirl element 47 can also be manufactured by electrochemical precipitation, in which case swirl element 47 can be given a multilayer configuration as shown in FIGS. 4 and 5. FIG. 4 shows a two-layer swirl element 47 in top view, while FIG. 5 is a cross-section view of a detail along line V—V in FIG. 4. In swirl element 47, an inner passage opening 81 is made, within which valve needle 20 moves longitudinally. The first, lower layer of swirl element 47 is a circular base plate 82, out from which several raised areas 83 extend into the second, upper layer. Raised areas 83 are configured so that they form and thus also delimit several swirl channels 63 between them, with swirl channels 63 being delimited downward by the upper face of base plate 82.

Swirl channels 63 open tangentially into swirl chamber 62 which surrounds passage opening 81 in the upper layer in a circular manner. On the side facing away from swirl chamber 62, swirl channels 63 extend directly to the outer circumference of swirl element 47. Extending from the outer circumference of swirl element 47, swirl channels 63, for example, taper with respect to their width all the way to swirl chamber 62. The outer swirl channel intake areas in themselves provide a low-turbulence inflow of fuel. Thus the swirl flow can be determined in advance in a particularly uniform and precise manner.

In the further exemplary embodiments of FIGS. 6–11, the parts which remain the same or have the same effect as in the exemplary embodiment presented in FIGS. 1 and 2 are identified with the same reference numbers. The guide and seat area depicted in FIG. 6 differs from that shown in FIG. 2 primarily in that a different method is provided for fastening valve seat element 26 to valve seat support 21. Since end 25 of valve seat support 21 downstream from step 51 is shortened, of the three elements 35, 47, and 26, only guide element 35 is received by passage opening 24 of valve seat support 21. The face side of swirl element 47 contacts lower end 25 of valve seat support 21. Swirl element 47, which is designed with a larger outside diameter, can advantageously have longer swirl channels 63 so that an even more low-turbulence flow can be achieved. Similarly to the outside diameter of swirl element 47, valve seat element 26 also has a larger outside diameter. Valve seat element 26 is fastened to valve seat support 21 using a circumferential weld seam 61 at the outer circumference of valve seat element 26 with weld seam 61 being provided, for example, in the area of swirl element 47.

In the exemplary embodiment of a fuel injection valve depicted in

Figure 7:
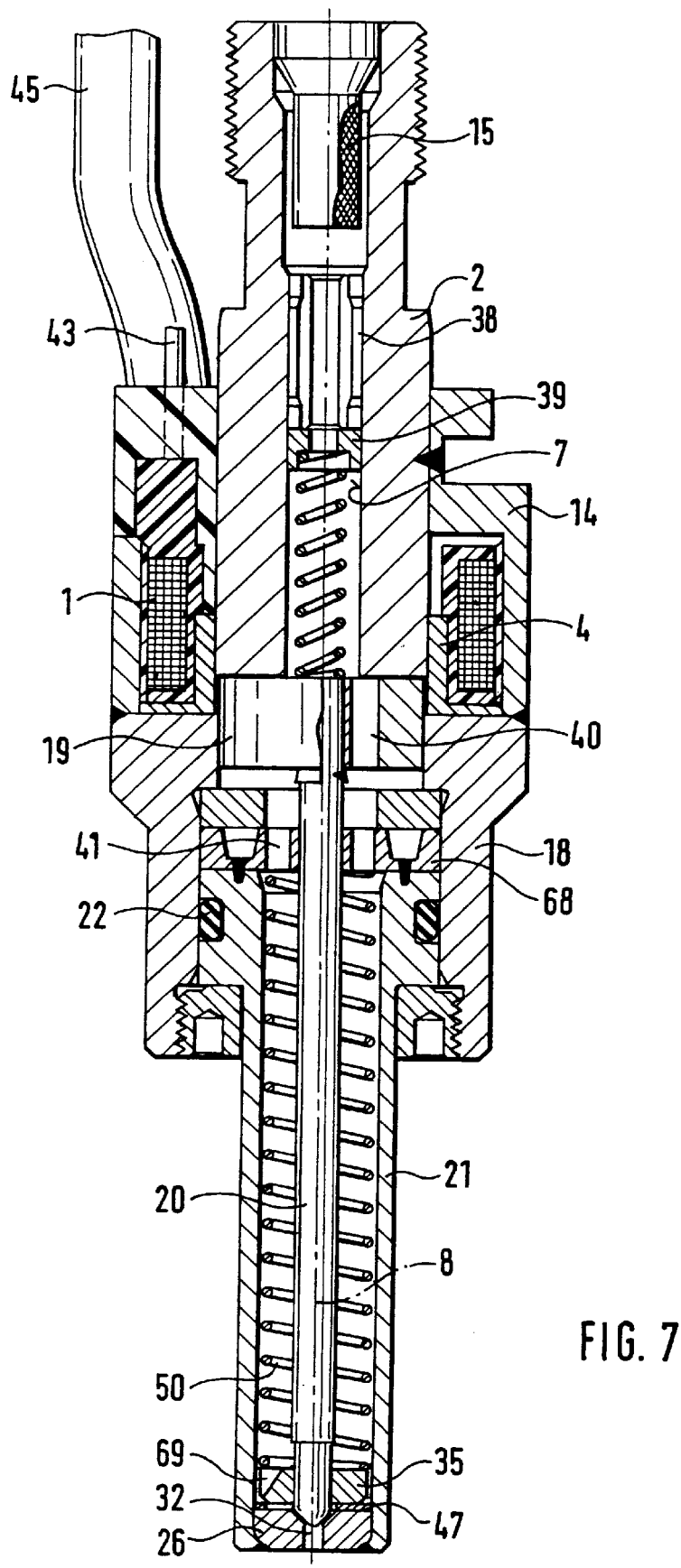
FIG. 7 shows a second exemplary embodiment of a fuel injection valve according to the present invention.

FIG. 7, valve seat support 21 is given a distinctly thinner walled design than in the exemplary embodiment shown in FIG. 1. While the lower end of compression spring 50 rests against the upper face of guide element 35, which thus becomes spring-loaded, without recess 52, the opposite end of compression spring 50 rests against a supporting disk 68. Supporting disk 68 is firmly joined to the upper end of valve seat support 21 through a weld seam. In place of connecting channels 41 in valve seat support 21, in this embodiment, supporting disk 68 has several axially oriented connecting through channels 41. For improved fuel flow, at least one groove-like flow channel 69 is formed at the outer circumference of guide element 35, as is made particularly clear in FIG. 8.

Figure 8:
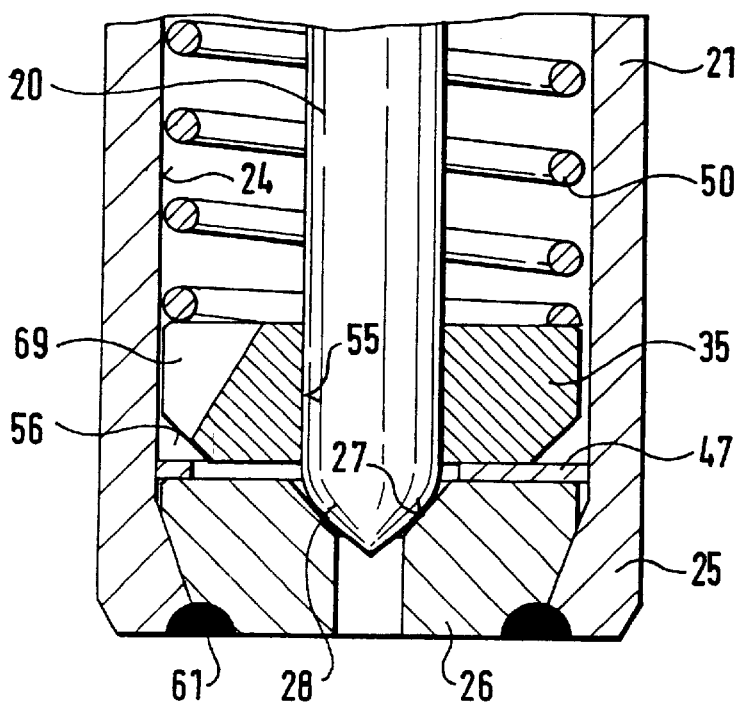
FIG. 8 shows a third exemplary embodiment according to the present invention of guide and seat area as an enlarged detail from FIG. 7.

In FIG. 8, the guide and seat area is depicted as a detail from FIG. 7, again with a changed scale, in order to better elucidate this valve area configured according to the present invention. The guide and seat area provided at the injection end 25 of valve seat support 21 in its passage opening 24 is again formed by the three axially successive, disk-shaped elements 35, 47, and 26. At lower end 25 of valve seat support 21, inner passage opening 24 is configured so as to be conically tapered in the direction of flow. Accordingly, valve seat element 26 also has a conically tapered outside contour for precise fit in valve seat support 21. In this exemplary embodiment, the three elements 35, 47, and 26 are introduced through passage opening 24 from above, that is, from the side facing armature 19 with valve seat element 26 being introduced first. In this case, weld seam 61 at lower end 25 of valve seat support 21 is subject to significantly less stress.

Figure 9:
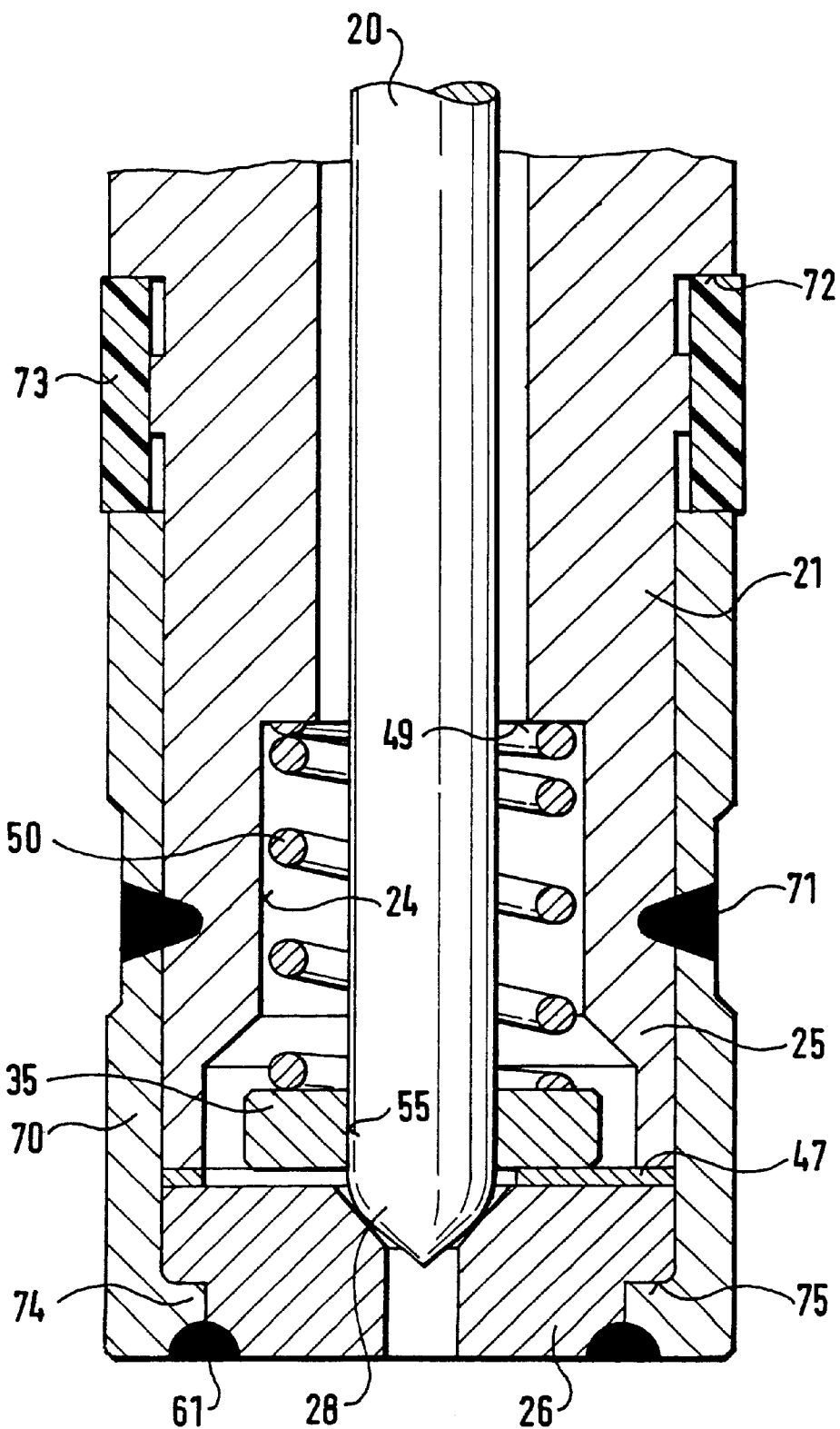
FIG. 9 shows a fourth exemplary embodiment according to the present invention of guide and seat area.

In FIG. 9, a further guide and seat area is depicted in which end 25 of valve seat support 21 is surrounded all the way around by an additional pipe-shaped fastening element 70. Similarly to the exemplary embodiment in FIG. 6, swirl element 47 and valve seat element 26 are provided with a larger outside diameter than the diameter of passage opening 24, for which reason swirl element 47 rests against end 25 of valve seat support 21 on the face side. Guide element 35 is designed as a flat disk and is arranged within passage opening 24 with its outside diameter being clearly smaller than the diameter of passage opening 24 so that fuel can flow axially along the outside circumference of guide element 35.

The firm connection of valve seat element 26 and valve seat support 21 is achieved through additional fastening element 70. Thin walled, pipe-shaped fastening element 70 surrounds both valve seat element 26 and swirl element 47 as well as end 25 of valve seat support 21, Valve seat element 26 and fastening element 70 are connected by weld seam 61 at their lower faces, which end flush with each other. In a particularly advantageous manner, the bottom face of fastening element 70 has a protruding shoulder 74 around its circumference to which valve seat element 26 with a step 75 can rest. As a result of this design of fastening element 70, weld seam 61 can be applied using less material and accordingly a lower degree of weld distortion. Weld seam 61 in such an embodiment is subject to significantly less stress than in the embodiment according to FIG. 2. The welding can therefore be performed with a lower amount of thermal energy, as a result of which the dimensional accuracy of valve seat element 26 is assured in any case.

Valve seat support 21 and fasting element 70 are joined by a second weld seam 71 which by way of example is configured to be somewhat thicker than weld seam 61 and which, for example, is applied upstream of guide element 35 from the outer circumference of fastening element 70. Because of additional fastening element 70, swirl element 47 and guide element 35 can be aligned very precisely with the longitudinal axis of valve seat support 21, as a result of which tilting or jamming of guide element 35 on valve needle 20 can be avoided. In passage opening 24 of valve seat support 21, again a compression spring 50 is installed, one end of which is in contact with spring-loaded guide element 35 and the end facing away from guide element 35 being supported on shoulder 49 in valve seat support 21. Between an outer shoulder 72 on valve seat support 21 and the upper end of fastening element 70 which is facing away from weld seam 61, a seal element 73 is inserted for example.

As mentioned above, valve closing section 28 in place of having a frustum shape can be configured in some other shape such as spherical. In the case of such a spherical section at the downstream end of valve needle 20, the center of the sphere is advantageously located at the axial height of guide element 35. In this way jamming of valve needle 20 in guide element 35 is effectively prevented.

For all exemplary embodiments of the present invention the play between valve needle 20 and guide element 35 in guide opening 55 is very small so that no leakage of fuel occurs in this area as a result of the pressure difference between the two faces of guide element 35. Guide element 35 has a clearly greater play in passage opening 24 than valve needle 20 has in guide opening 55.

Figure 10:
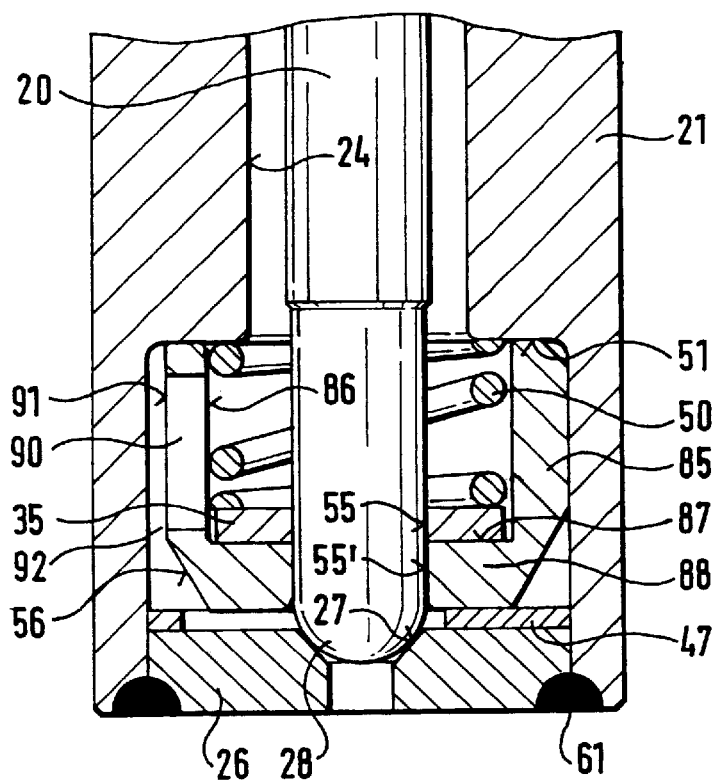
FIG. 10 shows a fifth exemplary embodiment according to the present invention of guide and seat area.
Figure 11:
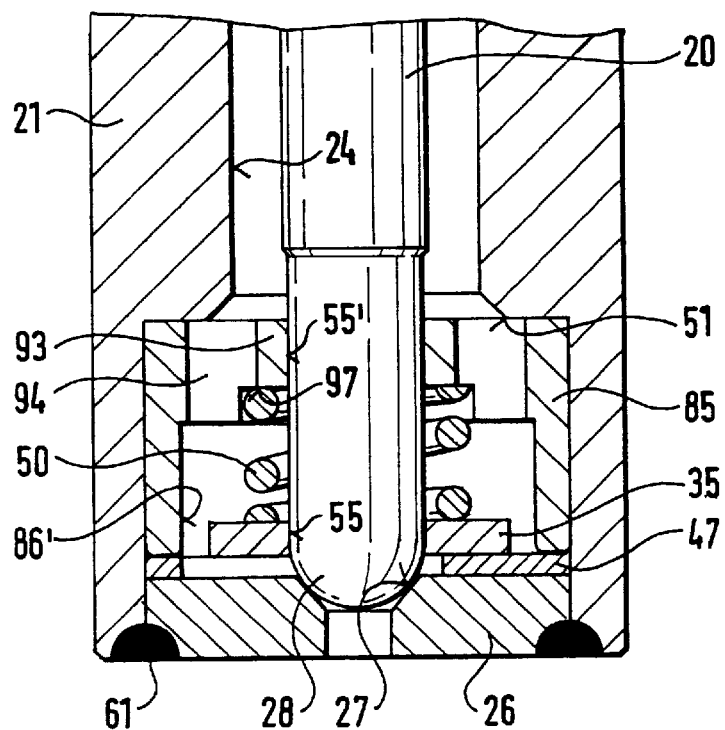
FIG. 11 shows a sixth exemplary embodiment according to the present invention of guide and seat area.

In FIGS. 10 and 11, guide and seat areas are depicted as two additional examples which in addition to elements 35, 47, and 26 described above, also each have an additional support element 85. While guide element 35 in each case is configured as a flat disk, support element 85 is a cylindrical body with the same outside diameter as the diameter of passage opening 24 of valve seat support 21 downstream from step 51. Support element 85 is firmly spring-loaded axially in the housing in valve seat support 21.

In the exemplary embodiment shown in FIG. 10, support element 85 has a recess 86 opposite valve seat element 26, at the bottom 87 of which guide element 35 rests. Bottom area 88 of support element 85 rests upon swirl element 47.

Recess 86 is continued in downstream direction with a guide opening 55' having a smaller diameter located in bottom area 88. Compression spring 50 like guide element 35 is arranged in recess 86 of support element 85, with compression spring 50 supported at one end on step 51 and at the other on guide element 35 which is thereby spring-loaded. On bottom area 88 of support element 85, guide element 35 is spring-loaded using compression spring 50 so as to be radially movable, and it can align itself according the valve needle 20.

In the wall of support element 85, at least one radial opening 90 is provided through which the fuel can pass out of recess 86 into a flow channel 92 formed between the inner wall of valve seat support 21 and the outer wall of support element 85 as a result of a diameter reduction provided in the form of a flattening or a groove. From flow channel 92, the fuel passes by chamfer 56 into swirl channel 63 of swirl element 47 and further to valve seat surface 27.

In the exemplary embodiment depicted in FIG. 11, support element 85 does not have a bottom area but rather a cover area 93 which has an interior central guide opening 55' through which valve needle 20 extends. In cover area 93, which contacts step 51, two or four axial openings 94, by way of example, are made which like guide opening 55' open out into a recess 86' opening into swirl element 47. The fuel flows into recess 86' through axial openings 94 from where it flows past guide element 35 into swirl channels 63 of swirl element 47 and on to valve seat surface 27.

Compression spring 50, like guide element 35, is arranged in recess 86' of support element 85, with compression spring 50 supported on one end on a shoulder 97 of cover area 93 of support element 85 between inner guide opening 55' and axial openings 94 and on the other end on guide element 35 which is thereby spring-loaded. Guide element 35 is spring-loaded on swirl element 47 with compression spring 50 so as to be radially movable, and it can align itself with valve needle 20.

Common to both of the last named exemplary embodiments is that a radial, movable, spring-loaded, for example disk-shaped guide element 35 is housed in a support element 85 which also has a guide area. Guide opening 55 of spring-loaded guide element 35 is of such a size that valve needle 20 passes through it with less play than when it passes through guide opening 55' of support element 85, which is spring-loaded in the housing. The play of valve needle 20 with respect to guide opening 55 is approximately 1 $\mu$m to 15 $\mu$m, while the play with respect to guide opening 55' is on the order of approximately 20 $\mu$m to 100 $\mu$m. These size specifications are only for the purpose of facilitating better comprehension and do not in any manner limit the present invention.

As a result of the relatively large play with respect to valve needle 20, support element 85 can be manufactured and assembled at a reduced cost. Support element 85 serves for pre-centering valve needle 20 during assembly and can be used as an "emergency guide." If as a result of dirt or other deposits, guide element 35 should adhere to valve needle 20 and move with it axially, guide opening 55' of support element 85 can still assume guidance of valve needle 20.

The primary difference between the two last described embodiments is the geometric arrangement of second guide opening 55'. On the one hand, guide opening 55' having greater play can be arranged between guide opening 55 having lesser play and valve seat surface 27 (FIG. 10); on the other hand, guide opening 55' can also be provided upstream from guide opening 55 (FIG. 11).

It should be expressly pointed out that the use of a swirl element 47 downstream from guide element 35 is not a limiting condition. On the contrary, it is also conceivable to provide swirl grooves on the lower face of guide element 35 which then form swirl channels as a result of being placed on valve seat element 26.

What is claimed is:

1. A fuel injection valve for a fuel injection system of an internal combustion engine, comprising:
    an electromagnetic circuit;
    a valve seat element;
    a stationary valve seat situated on the valve seat element;
    a valve needle axially moving along a longitudinal valve axis of the valve, the valve needle including a valve closing section, the valve closing section cooperating with the valve seat, the valve closing section opening and closing the valve;
    a guide element situated upstream from the valve seat element, the guide element having an interior guide opening, the valve needle axially moving in the guide opening; and
    a compression spring acting on the guide element, the compression spring being situated with respect to the guide element such that a direction of action of the compression spring spring-loads the guide element toward the valve seat element.

2. The valve according to claim 1, wherein the valve directly injects a fuel into a combustion chamber of the internal combustion engine.

3. The valve according to claim 1, further comprising:
    a swirl element situated between the guide element and the valve seat element, the compression spring pressing the guide element directly against the swirl element and the valve seat element.

4. The valve according to claim 3, wherein an encircling chamfer is formed at an outer circumference of the guide element, the encircling chamfer facing in a direction of the swirl element.

5. The valve according to claim 3, wherein the swirl element has a disk shape.

6. The valve according to claim 5, wherein the swirl element has a plurality of swirl channels, the plurality of swirl channels being opened tangentially into an inner swirl chamber of the swirl element.

7. The valve according to claim 6, wherein the swirl element is manufactured as a single layer using a metal sheet.

8. The valve according to claim 7, wherein the swirl element has a multi-layer design, the swirl element being manufactured using a electrochemical precipitation procedure.

9. The valve according to claim 7, wherein the guide element has a recess, the recess facing away from the valve seat element, the compression spring being supported on a bottom of the recess.

10. The valve according to claim 1, wherein the guide element has a flat face in a particular direction, the particular direction being opposite to the valve seat element, the compression spring being supported on the flat face.

11. The valve according to claim 10, wherein at least one groove-like flow channel is formed into an outer circumference of the guide element.

12. The valve according to claim 11, wherein the guide element is situated in a passage opening of a valve seat support, a first play of the guide element being greater than a second play of the valve needle.

13. The fuel injection valve according to claim 2, wherein the passage opening has a shoulder, a first end of the compression spring contacting the shoulder, a second end of the compression spring being supported on the guide element.

14. The valve according to claim 13, further comprising:
a support disk fastened on the valve seat support, a first end of the compression spring contacting the support disk, a second end of the compression spring being supported on the guide element.

15. The valve according to claim 14, further comprising:
a support element having a recess, the guide element inserted in the recess, the recess situated in a passage opening of a valve seat support, the support element having a further interior guide opening, the valve needle axially moving in the further guide opening.

16. The valve according to claim 14, wherein the valve needle has a first play and a second play, the first play extending through the guide opening, the second play extending through the further guide opening, a size of the guide opening allowing the first play to be smaller than the second play.

17. The valve according to claim 16, wherein the first play is between 1 $\mu$m and 20 $\mu$m, the second play being between 20 $\mu$m and 100 $\mu$m.

* * * * *